US011307912B1

(12) United States Patent
Williston et al.

(10) Patent No.: US 11,307,912 B1
(45) Date of Patent: Apr. 19, 2022

(54) FORWARD MESSAGE COMPATIBILITY SAFETY IN PRODUCER-CONSUMER SYSTEMS

(71) Applicant: Amazon Technologies, Inc., Seattle, WA (US)

(72) Inventors: Frank Gregory Williston, Mukilteo, WA (US); Marcel Andrew Levy, Seattle, WA (US); Andrew Ketcham, Seattle, WA (US); Blake P. Hess, Lake Forest Park, WA (US)

(73) Assignee: Amazon Technologies, Inc., Seattle, WA (US)

( * ) Notice: Subject to any disclaimer, the term of this patent is extended or adjusted under 35 U.S.C. 154(b) by 18 days.

(21) Appl. No.: 17/036,362

(22) Filed: Sep. 29, 2020

(51) Int. Cl.
*G06F 9/54* (2006.01)
*G06F 8/65* (2018.01)
*G06F 9/50* (2006.01)

(52) U.S. Cl.
CPC ............... *G06F 9/546* (2013.01); *G06F 8/65* (2013.01); *G06F 9/5038* (2013.01)

(58) Field of Classification Search
CPC . G06F 9/546; G06F 8/65; G06F 8/654; G06F 8/656; G06F 8/658
See application file for complete search history.

(56) References Cited

U.S. PATENT DOCUMENTS

| 10,362,131 | B1 * | 7/2019 | Robbins | ............... H04L 67/2809 |
| 2003/0093576 | A1 * | 5/2003 | Dettinger | ................ G06F 9/546 719/313 |
| 2011/0113111 | A1 * | 5/2011 | Reed | ...................... H04L 69/329 709/206 |
| 2016/0173546 | A1 * | 6/2016 | Murthy | ................... H04L 67/02 709/217 |
| 2021/0320970 | A1 * | 10/2021 | Gupta | ................. H04L 67/1034 |

* cited by examiner

Primary Examiner — Brian W Wathen
(74) Attorney, Agent, or Firm — BakerHostetler

(57) ABSTRACT

A set of consumers of a producer-consumer system includes a main consumer subset and a backstop consumer subset. A plurality of updates to message processing information are deployed to the set of consumers. Each update of the plurality of updates is first deployed to the backstop consumer sub-set and is subsequently deployed to the main consumer subset. The main consumer subset may obtain messages from producers and attempt to process the messages. By contrast, the backstop consumer subset may obtain messages only after a failed processing attempt by the main consumers. Upon obtaining a message, a main consumer may process the message successfully or may fail processing and provide the message for processing by a backstop consumer, which may be more up to date than the main consumer.

20 Claims, 8 Drawing Sheets

FORWARD MESSAGE COMPATIBILITY SAFETY IN PRODUCER-CONSUMER SYSTEMS

BACKGROUND

Message producer-consumer systems are employed in a variety of computing services and architectures. One specific example of a service in which producer-consumer systems may be employed is a certificate management service. In some examples, updates related to message formatting may be periodically deployed to message producers and to message consumers. In some examples, problems may arise when message a producer has its message format updated before a consumer has been updated. This may sometimes result in a scenario in which the consumer is unable to process a message, for example because the consumer has not yet been updated to read the format of the message. This problem may sometimes be amplified in cases in which some message consumers also act as message producers and may be reading a newer format but still sending out an older format. If each of these consumers gets deployed to separately, it is possible to have consumers in various states of receiving and sending both newer and older message formats, thereby exacerbating the problem further.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
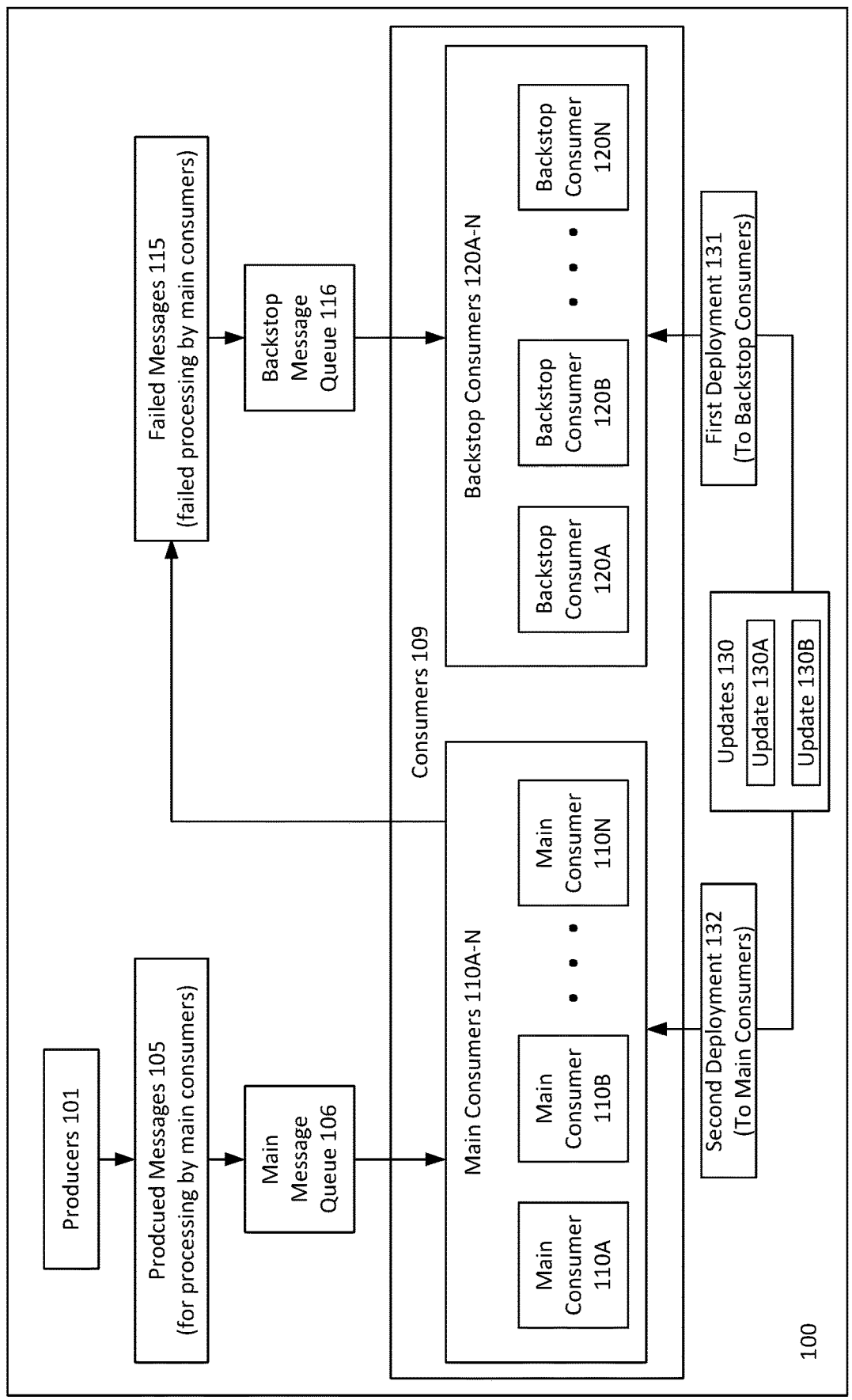
FIG. 1 is a diagram illustrating an example producer-consumer system with forward compatibility safety that may be used in accordance with the present disclosure.

Techniques for forward message compatibility safety in producer-consumer systems are described herein. Producer-consumer systems are computing systems in which computer messages are generated, queued and processed. Specifically, producers are computing components and/or computing processes that may generate messages, insert the generated messages into a buffer that serves as a queue, and repeat the message generation and queueing steps. Consumers are computing components and/or computing processes that may obtain messages (e.g., from a queue), process (or attempt to process) the messages, and repeat the message obtaining and processing steps. A message, as that term is used herein, refers to a discrete computer-produced and computer-processable item that is processable to result in a modification of a computing state. One specific example of a service in which a producer-consumer system may be employed is a certificate management service, which is a service that allows provisioning, management, and deployment of digital certificates, such as public and private digital certificates.

In many producer-consumer systems, updates related to message formatting may be periodically deployed to message producers and to message consumers. In some examples, when both a message producer and a message consumer have received the same updates, it is expected that the message consumer will be able to read and process formats of messages that are generated by that producer. By contrast, when a message producer has received an update that has not yet been received by a message consumer, it is possible that a message generated by the producer may have a format that cannot be read and processed by the message consumer. In some cases, due to the large scale of some producer-consumer systems, a substantial amount of time may sometimes be required to deploy a given update to all consumers in the system. Thus, in these and other scenarios, there is a possibility that, at any given time, an update that has already been deployed to a producer may not yet have been deployed to at least some of the consumers in the system. If one of these non-updated consumers attempts to process a message generated by the producer, then it is possible that the non-updated consumer may be unable to read and process the message. This may result in several problems. For example, because the consumer may be unaware of the forward compatibility problems, the consumer may attempt to repeatedly retry processing of the message, even though the consumer is incapable of successfully processing the message until it receives the update. This may result in delays and may divert consumer resources away from other tasks. Moreover, in some examples, the message may be lost or expired before it can be successfully processed, thereby potentially resulting in errors and other problems.

According to the techniques described herein, a set of consumers in a producer-consumer system may be split into a main consumer subset and a backstop consumer subset. When an update is deployed to the set of consumers, the update is first deployed to each backstop consumer in the backstop consumer subset. The update is then deployed to the main consumer subset only after each of the backstop consumers have received the update. By deploying updates in this manner, it is guaranteed that the backstop consumers will receive an update prior to any of the main consumers. In some examples, the main consumers may receive messages from the producers via one or more main consumer queues. By contrast, the backstop consumers may not receive messages from the message producers via a main consumer queue. Rather, the backstop consumers may only receive and process messages whose processing was first attempted and failed by a main consumer.

The message producers may generate messages and insert the messages into a main consumer queue. The main consumers may receive queued messages from the message producers, via the main consumer queue, and attempt to process the messages. In some cases, a main consumer may be capable of successfully processing a message that is obtained from the queue. By contrast, in other cases, a main consumer may be unable to process an obtained message, and the message processing attempt may fail. When a main consumer is unable to process a message, the message may then be provided from the main consumer to a backstop consumer. For example, the message may be inserted into a backstop consumer queue, from which the backstop consumer may obtain the message. Upon receiving the message from the backstop consumer queue, the backstop consumer may attempt to process the message.

In some examples, an update that is required to process the message may have not yet been received by the main consumer but may have already been received by the backstop consumer. In this scenario, the backstop consumer may successfully read and process the message. By contrast, in some examples, an update that is required to process the message may have not yet been received the main consumer and may also have not yet been received by the backstop consumer. In this scenario, the backstop consumer may also be unable to read and process the message. Because the backstop consumers are guaranteed to receive updates prior to the main consumers, a failure of the backstop consumer to process the message may indicate that the set of consumers is not ready to process the message's format. Thus, in this case, the backstop consumer may optionally signal to the producer to rollback and/or send the affected message to a dead letter queue.

The use of main consumers and backstop consumers in this manner may provide a number of advantages. For example, these techniques may allow message format updates/changes to be deployed in a way that protects the availability of message consumers that are still on an older format and that also allows for processing of a newer format. These techniques may also assist in avoiding ambiguity in scenarios in which a message cannot be processed. When a main consumer cannot process a message, an attempt is made to process the message by a backstop consumer. If the backstop consumer cannot process the message, then it becomes clear that the message is not yet ready for processing by the set of consumers (or that the message has failed for other reasons, such as an internal error, etc.). Thus, the techniques described herein may assist in avoiding scenarios in which a main consumer wastes resources by repeatedly attempting to process a message for which the consumer has not yet been updated. The possibility that messages may be lost or expired before they are processed may also be reduced. These techniques may also allow messages to be retried more aggressively by the backstop consumers, because the backstop consumers are updated first. Moreover, the techniques described herein may allow users of a producer-consumer system to deploy updates with higher confidence and safety and alleviate the fear that updating the system may result in delays and errors due to forward incompatibility.

FIG. 1 is a diagram illustrating an example of a producer-consumer system 100 with forward compatibility safety that may be used in accordance with the present disclosure. As shown in FIG. 1, producer-consumer system 100 includes producers 101 and consumers 109. Producers 101 are computing components and/or computing processes that generate produced messages 105, insert the queued messages into main message queue 106, and repeat the message generation and queueing steps. In some examples, the producer-consumer system 100 may be employed by a computing service, such as a certificate management service or other computing service. It is noted that the producers 101 may include message producers that are internal to a service that employs the consumer-producer system. The producers 101 may also include message producers that are external to the service that employs the consumer-producer system, such as message producers operated by customers of the service.

In the example of FIG. 1, updates 130 are periodically deployed to consumers 109. The updates 130 may be message processing updates, which are updates to message processing information that is deployed to the consumers 109 and used by the consumers 109 to process messages. Although not shown in FIG. 1, the updates 130 (or respective producer versions of the updates 130) may also periodically be deployed to producers 101. In the example of FIG. 1, updates 130 individually include update 130A and update 130B. For example, in some cases, update 130A may be an earlier update that is deployed first, while update 130B may be a later update that is deployed after update 130B. Any number of other updates (not shown in FIG. 1) may also be deployed. The updates 130 may generally relate to formatting of the produced messages 105. As described above, in some examples, when both a message producer and a message consumer have received the same updates, it is expected that the message consumer will be able to read and process formats of messages that are generated by that producer. By contrast, when a message producer has received an update that has not yet been received by a message consumer, it is possible that a message generated by the producer may have a format that cannot be read and processed by the message producer.

As shown in FIG. 1, consumers 109 are split into main consumers 110A-N and backstop consumers 120A-N. When an update 130 is deployed to consumers 109, the update 130 is first deployed to each backstop consumer 120A-N via a first deployment 131. The update 130 is then deployed to each main consumer 110A-N, via a second deployment 132, only after each of the backstop consumers 120A-N have received the update 130. By deploying updates 130 in this manner, it is guaranteed that the backstop consumers 120A-N will receive an update prior to any of the main consumers 110A-N. It is noted, however, that it is not required that all backstop consumers 120A-N receive the update 130 via the first deployment 131 at exactly the same time or that all main consumers 110A-N receive the update 130 via the second deployment 132 at exactly the same time. As a specific example, when update 130A is deployed, the update 130A is first deployed to each backstop consumer 120A-N via a first deployment 131. The update 130A is then deployed to each main consumer 110A-N, via a second deployment 132, only after each of the backstop consumers 120A-N have received the update 130A. Additionally, when update 130B is subsequently deployed, the update 130B is first deployed to each backstop consumer 120A-N via a first deployment 131. The update 130B is then deployed to each main consumer 110A-N, via a second deployment 132, only after each of the backstop consumers 120A-N have received the update 130B.

In the example of FIG. 1, the producers 101 generate and provide produced messages 105 into only a single message queue (main message queue 106) for processing by the main consumers 110A-N. It is noted, however, that any number of message queues may be employed for use with the techniques described herein. In some cases, the techniques described herein may be particularly advantageous when used in systems that employ only a single queue (or another small quantity of message queues) for queueing of messages for processing by the main consumers 110A-N. One reason for this is that, when a queue becomes backed up or delayed in a system with a single queue (or other small quantity of queues), the delays will impact the entire system (in the case of a single queue) or a potentially large portion of the entire system (in the case of a small quantity of queues). Thus, for example, if consumers are wasting resources and increasing delays by attempting to retry messages that they have not been updated to process, the effects of these delays may be more widespread and impactful in system with a single message queue (or small quantity of message queues). A certificate management service is one type of service in which a producer-consumer system with a single queue (or single queue per region/regional stack) may sometimes be employed.

As shown in FIG. 1, the main consumers 110A-N may obtain produced messages 105 from the producers 101 (via main message queue 106) and attempt to process the produced messages 105. A given non-specific one of the main consumers 110A-N may be referred to individually herein as a main consumer 110, while a given non-specific one of the backstop consumers 120A-N may be referred to individually herein as a backstop consumer 120. In some cases, a main consumer 110 may process a produced message 105 successfully. However, in other cases, a main consumer 110 may attempt and fail processing of a produced message 105. When a main consumer 110 attempts and fails to process one of the produced messages 105, the message may then be sent from the main consumer 110 to a backstop message queue 116 for processing by a backstop consumer 120. In the example of FIG. 1, failed messages 115 are a subset of produced messages 105 whose processing has been attempted and failed by a main consumer 110. As shown, upon failure of processing, the failed messages 115 are inserted into the backstop message queue 116.

A backstop consumer 120 may obtain one of the failed messages 115 from the backstop message queue 116 and attempt to process the message. In some examples, an update that is required to process the message may have not yet been received by the main consumer 110 but may have already been received by the backstop consumer 120. In this scenario, the backstop consumer 120 may successfully read and process the message. By contrast, in some examples, an update that is required to process the message may have not yet been received the main consumer 110 and may also have not yet been received by the backstop consumer 120. In this scenario, the backstop consumer 120 may also be unable to read and process the message. Because the backstop consumers 120A-N are guaranteed to receive updates prior to the main consumers 110A-N, a failure of the backstop consumer 120 to process the message may indicate that the consumers 109 are not ready to process the message's format.

Thus, as shown in FIG. 1 and described above, the main consumers 110A-N receive produced messages 105 from the producers 101 via main message queue 106. By contrast, the backstop consumers do not receive produced messages 105 directly from the main message queue 106. Rather, the backstop consumers 120A-N only receive and process failed messages 115 whose processing was first attempted and failed by a main consumer 110.

Figure 2:
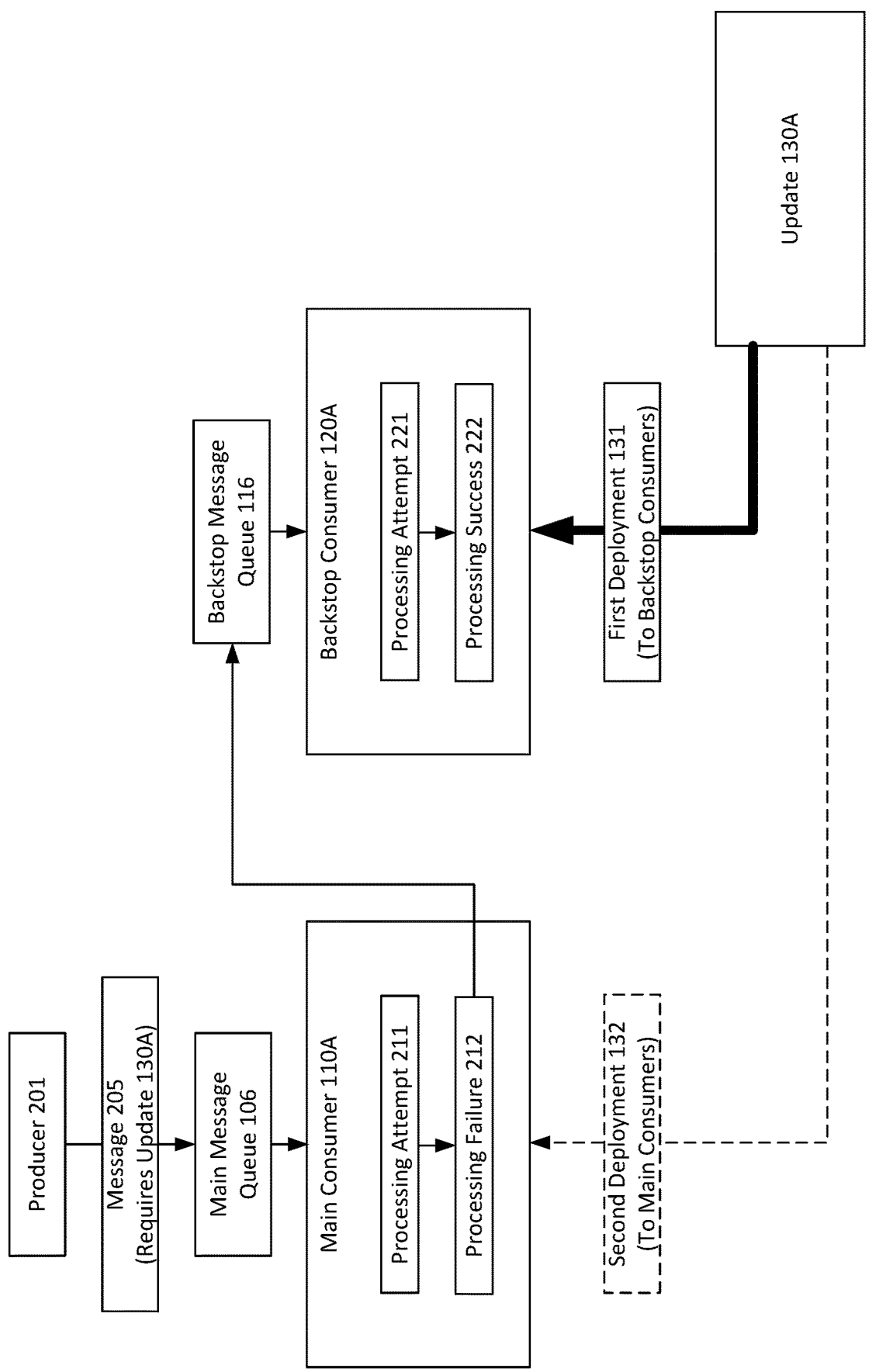
FIG. 2 is a diagram illustrating a first example message processing workflow that may be used in accordance with the present disclosure.

Referring now to FIG. 2, a first example message processing workflow will now be described in detail. In the example of FIG. 2, a message 205 is generated by a producer 201 and inserted into main message queue 106. As indicated in FIG. 2, the message 205 has a format that requires the use of update 130A in order for the message 205 to be successfully read and processed. For example, update 130A may include computer instructions that allow the format of information in message 205 to be successfully read and processed. As shown in FIG. 2, main consumer 110A may retrieve message 205 from main message queue 106 in order to attempt to process the message 205.

In the example of FIG. 2, update 130A has already been deployed to the backstop consumers 120A-N via first deployment 131. Thus, in FIG. 2, the update 130A has been deployed to backstop consumer 120A. This is indicated in FIG. 2 by using a thick black line (associated with first deployment 131) to point from update 130A to backstop consumer 120A to show that the update 130A has been deployed to backstop consumer 120A. By contrast, in the example of FIG. 2, update 130A has not yet been deployed to the main consumers 110A-N via second deployment 132. Thus, in FIG. 2, the update 130A has not yet been deployed to main consumer 110A. This is indicated in FIG. 2 by using a dashed line (associated with second deployment 132) to point from update 130A to main consumer 110A to show that the update 130A has not yet been deployed to main consumer 110A.

When the main consumer 110A obtains message 205 from main message queue 106, the main consumer 110A may perform a processing attempt 211 in order to attempt to process the message 205. However, in this example, because processing of message 205 requires update 130A, and because main consumer 110A has not yet received update 130A, the main consumer 110A is not yet able to process the message 205. Thus, in this example, processing attempt 211 by main consumer 110A results in a processing failure 212.

As described above, when a main consumer fails to process a message, the main consumer may send the message to a backstop consumer for processing. Accordingly, in the example of FIG. 2, as a result of processing failure 212, the main consumer 110A sends the message 205 to backstop message queue 116 for processing. The backstop consumer 120A then obtains message 205 from the backstop message queue 116 for processing. When the backstop consumer 120A obtains message 205, the backstop consumer 120A may perform a processing attempt 221 in order to attempt to process the message 205. In this example, because processing of message 205 requires update 130A, and because backstop consumer 120A has received update 130A, the backstop consumer 120A is able to process the message 205. Thus, in this example, processing attempt 221 by backstop consumer 120A results in a processing success 222. Accordingly, in this scenario, the use of backstop consumer 120A is advantageous by allowing the message 205 to be processed by the backstop consumer 120A. This helps prevent against scenarios in which the main consumer 110A wastes resources by repeatedly attempting to process the message 205 before the main consumer 110A is updated with update 130A. Additionally, this also helps prevent against unnecessary delays from having to wait until the main consumer 110A is updated with update 130A. Furthermore, this also helps prevent against scenarios in which the message 205 is lost or expired while waiting for the main consumer 110A to be updated with update 130A.

Figure 3:
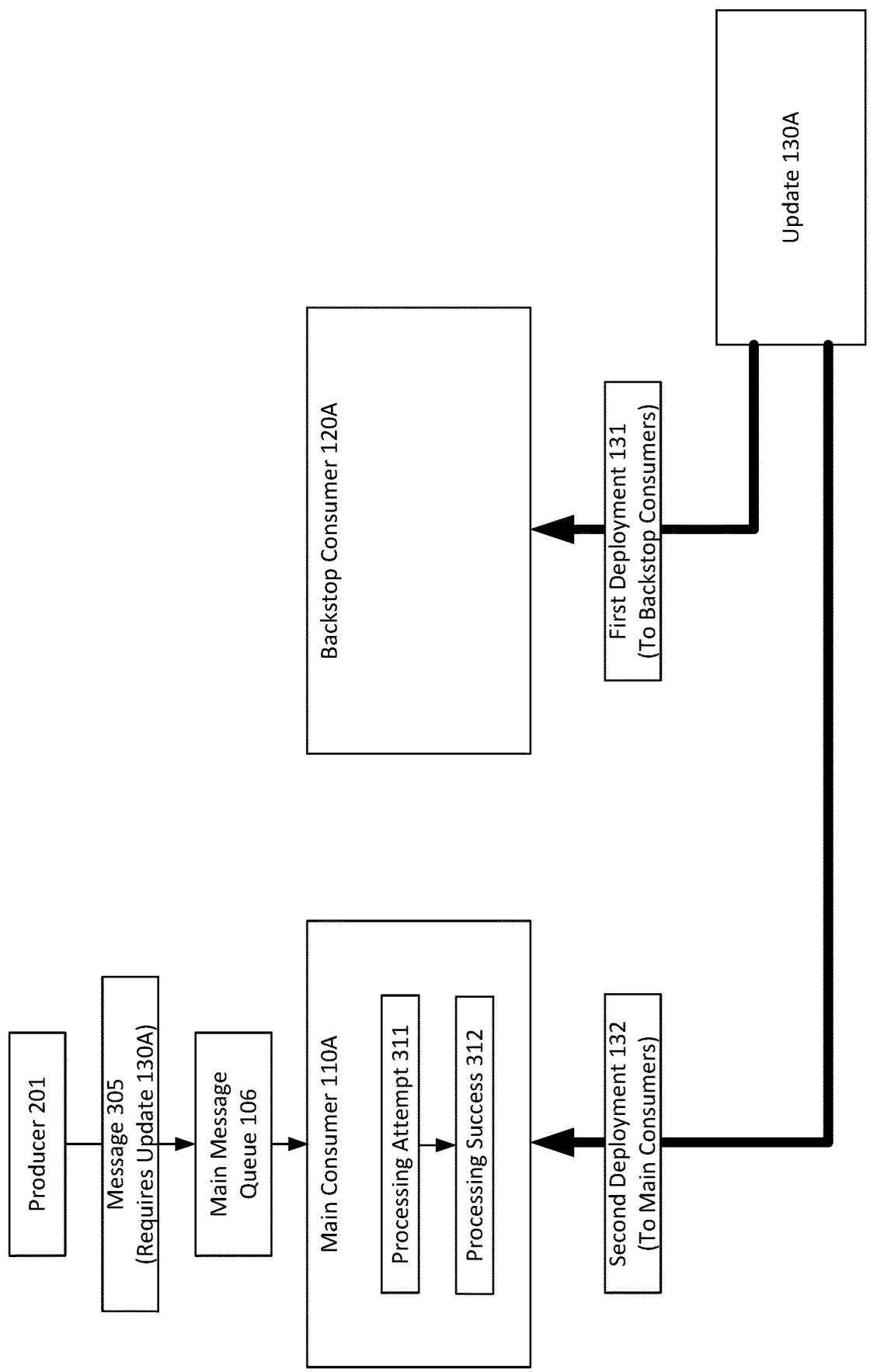
FIG. 3 is a diagram illustrating a second example message processing workflow that may be used in accordance with the present disclosure.

Referring now to FIG. 3, a second example message processing workflow will now be described in detail. In the example of FIG. 3, a message 305 is generated by producer 201 and inserted into main message queue 106. Similar to message 205 of FIG. 2, message 305 of FIG. 3 also has a format that requires the use of update 130A in order for the message 305 to be successfully read and processed. As shown in FIG. 3, main consumer 110A may retrieve message 305 from main message queue 106 in order to attempt to process the message 305.

In the example of FIG. 3, update 130A has already been deployed to the backstop consumers 120A-N via first deployment 131. Thus, in FIG. 2, the update 130A has been deployed to backstop consumer 120A. This is indicated in FIG. 2 by using a thick black line (associated with first deployment 131) to point from update 130A to backstop consumer 120A to show that the update 130A has been deployed to backstop consumer 120A. It is noted however, that the example shown in FIG. 3 depicts a later stage of the deployment of update 130 then is shown in the previous example of FIG. 2. Specifically, in the example of FIG. 3, update 130A has also already been deployed to the main consumers 110A-N via second deployment 132. Thus, in FIG. 3, the update 130A has been deployed to main consumer 110A. This is indicated in FIG. 3 by using a thick black line (associated with second deployment 132) to point from update 130A to main consumer 110A to show that the update 130A has been deployed to main consumer 110A.

When the main consumer 110A obtains message 305 from main message queue 106, the main consumer 110A may perform a processing attempt 311 in order to attempt to process the message 305. In this example, because processing of message 305 requires update 130A, and because main consumer 110A has already received update 130A, the main consumer 110A is able to process the message 305. Thus, in this case, processing attempt 311 by main consumer 110A results in a processing success 312. Accordingly, the example of FIG. 3 shows that the techniques described herein may allow main consumers to process messages for which they received the necessary updates, without requiring the extra steps of providing those messages to, and attempting processing by, the backstop consumers.

Figure 4:
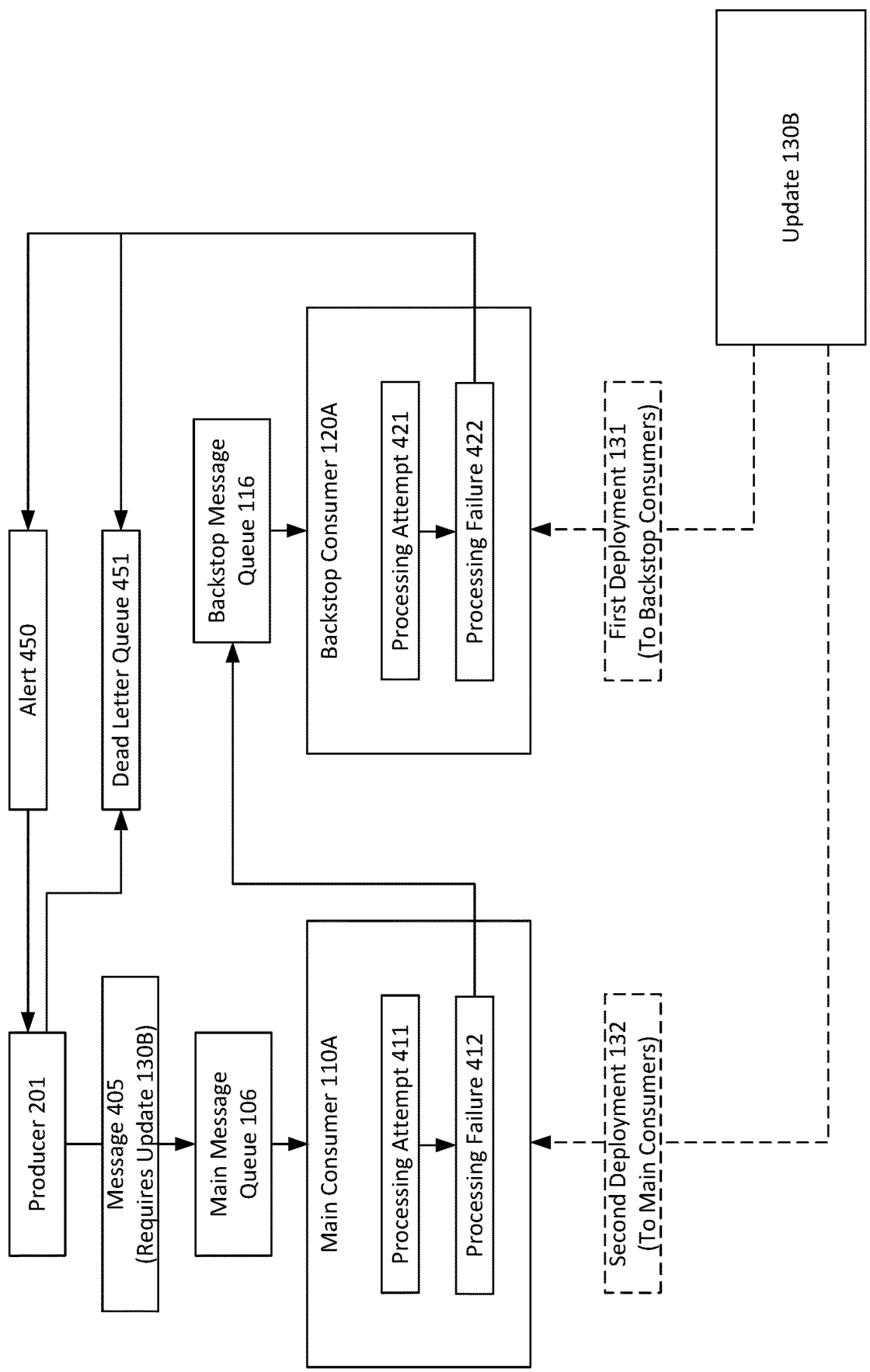
FIG. 4 is a diagram illustrating a third example message processing workflow that may be used in accordance with the present disclosure.

Referring now to FIG. 4, a third example message processing workflow will now be described in detail. In the example of FIG. 4, a message 405 is generated by a producer 201 and inserted into main message queue 106. Unlike messages 205 and 305 of FIGS. 2 and 3 (which required the use of update 130A), the message 405 has a format that requires the use of update 130B in order for the message 405 to be successfully read and processed. For example, update 130B may include computer instructions that allow the format of information in message 405 to be successfully read and processed. As shown in FIG. 2, main consumer 110A may retrieve message 405 from main message queue 106 in order to attempt to process the message 405.

In the example of FIG. 4, update 130B not yet been deployed to the backstop consumers 120A-N via first deployment 131. Thus, in FIG. 4, the update 130B has not yet been deployed to backstop consumer 120A. This is indicated in FIG. 4 by using a dashed line (associated with first deployment 131) to point from update 130B to backstop consumer 120A to show that the update 130B has not yet been deployed to backstop consumer 120A. Additionally, in the example of FIG. 4, update 130B has also not yet been deployed to the main consumers 110A-N via second deployment 132. Thus, in FIG. 4, the update 130B has not yet been deployed to main consumer 110A. This is indicated in FIG. 2 by using a dashed line (associated with second deployment 132) to point from update 130B to main consumer 110A to show that the update 130B has not yet been deployed to main consumer 110A.

When the main consumer 110A obtains message 405 from main message queue 106, the main consumer 110A may perform a processing attempt 411 in order to attempt to process the message 405. In this example, because processing of message 405 requires update 130B, and because main consumer 110A has not yet received update 130B, the main consumer 110A is not yet able to process the message 405. Thus, in this example, processing attempt 411 by main consumer 110A results in a processing failure 412.

As described above, when a main consumer fails to process a message, the main consumer may send the message to a backstop consumer for processing. Accordingly, in the example of FIG. 4, as a result of processing failure 412, the main consumer 110A sends the message 405 to backstop message queue 116 for processing by a backstop consumer. The backstop consumer 120A then obtains message 405 from the backstop message queue 116 for processing. When the backstop consumer 120A obtains message 405, the backstop consumer 120A may perform a processing attempt 421 in order to attempt to process the message 405. In this example, because processing of message 405 requires update 130B, and because backstop consumer 120A has not yet received update 130B, the backstop consumer 120A is unable to process the message 405. Thus, in this example, processing attempt 421 by backstop consumer 120A results in a processing failure 422.

Because the backstop consumers 120A-N are guaranteed to receive updates prior to the main consumers 110A-N, the processing failure 422 of the backstop consumer 120A to process the message 405 may indicate that consumers in the producer-consumer system (producers 109 of FIG. 1) are not ready to process the format of message 405. This is because the update 130B has not yet been deployed to the main consumers 110A-N or the backstop consumers 120A-N. Thus, in this case, the backstop consumer 120A generates an alert 450, which is provided to the producer 201. The alert 450 may signal the producer 101 to perform a rollback, such as to temporarily revert to producing messages having an older format associated with an older update (e.g. update 130A) that the consumers 109 are capable of successfully reading and processing. The message 405 may also be sent to a dead letter queue 451.

In some examples, a backstop consumer may reattempt processing of a message any number of times before either successfully processing the message or determining to discontinue attempting processing of the message (and optionally generating an alert and/or sending the message to a dead letter queue). Additionally, in some examples, a main consumer may also reattempt processing of a message any number of times before either successfully processing the message or providing the message to the backstop consumers. It is noted, however, that it may be advantageous for retries to be performed more rigorously by the backstop consumer than by the main consumer. This is because new updates are guaranteed to be deployed to the backstop consumers prior to being deployed to any of the main consumers. Thus, reattempting processing of messages more rigorously at a backstop consumer than at a main consumer may be more efficient because it may reduce the risk that the message is failing processing due to a forward compatibility error. Thus, the backstop consumer subset may be configured to reattempt processing more rigorously than the main consumer subset. This may include scenarios in which the backstop consumers are permitted more retry attempts than the main consumers. This may also include scenarios in which the backstop consumers are permitted one or more retry attempts and the main consumers are not permitted any retry attempts at all.

Figure 5:
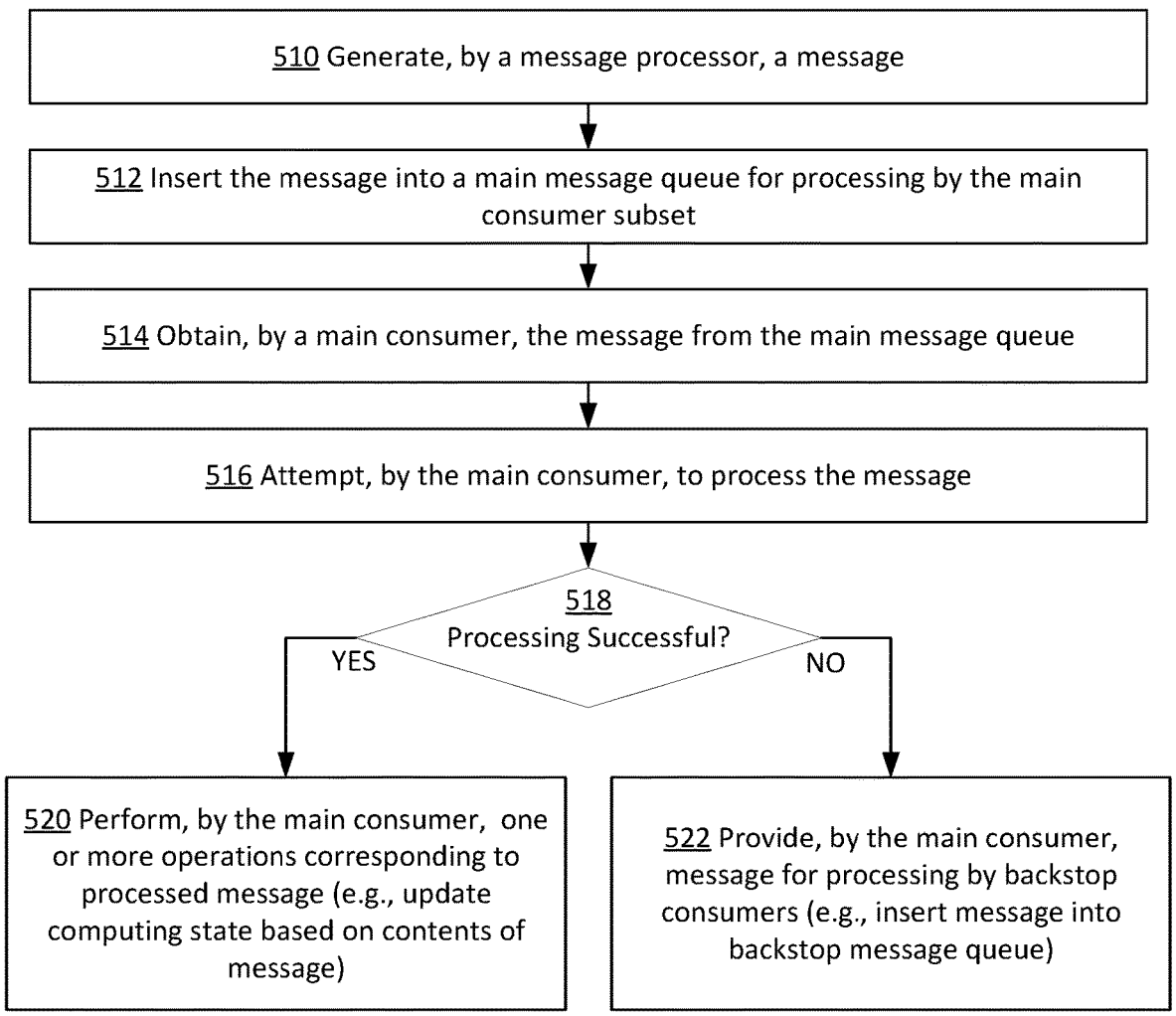
FIG. 5 is a flowchart illustrating a first example process for message processing with forward compatibility safety that may be used in accordance with the present disclosure.

Referring now to FIG. 5 a first example process for message processing with forward compatibility safety will now be described in detail. The process of FIG. 5 is initiated at operation 510, at which a message producer generates a message. As described above, the message producer may be included in a producer-consumer system. The producer-consumer system may also include a set of consumers that includes a main consumer subset and a backstop consumer subset. A plurality of updates may be deployed to the set of consumers. The plurality of updates may be message processing updates, which are updates to message processing information that is deployed to the set of consumers and used by the set of consumers to process messages. Each update of the plurality of updates may first be deployed to the backstop consumer sub-set and may subsequently be deployed to the main consumer subset. The backstop consumer subset may receive only messages that have failed processing attempts performed by the main consumer subset. At operation 512, the message may be inserted into a main message queue for processing by the main consumer subset.

At operation 514, a main consumer obtains the message from the main message queue. As described above, in some examples, the main consumer subset may receive messages from only a single message queue (e.g., main message queue 106 of FIG. 1). At operation 516, the main consumer attempts to process the message. For example, the main consumer may attempt to process the message based on a most recent message processing update (and potentially one or more prior message processing updates) that have been deployed to the main consumer at the time that the main consumer attempts to process the message. By contrast, the main consumer may not be able to employ message updates that have not yet been deployed to the main consumer at the time that the main consumer attempts to process the message.

At operation 518, it is determined if the message processing attempt by the main consumer is successful. For example, if the main consumer successfully reads data included in the message, such as by having compatibility with data formats employed in the message, then the main consumer may determine that processing is successful. By contrast, if the main consumer is unable to read data included in the message, such as because it does not have compatibility with one or more data formats employed in the message, then the main consumer may determine that processing has failed. If the message processing attempt is successful and the main consumer processes the message, then, at operation 520, the main consumer performs one or more operations corresponding to the processed message. For example, these operations may include updating a computing state based on contents of message. As a specific example, for certificate management services, this may include updating a state associated with a lifecycle of a certificate managed by the service.

By contrast, if the main consumer determines that the message processing attempt fails, then, at operation 522, the main consumer provides, based on the failure of the processing attempt, the message for processing by the backstop consumer subset. For example, the main consumer may insert the message into a backstop message queue. As described above, in some examples, the main consumer subset may retrieve messages from one or more main message queues, and the backstop consumer subset may retrieve messages from one or more backstop message queues. The one or more backstop message queues may be separate from the one or more main message queues.

Figure 6:
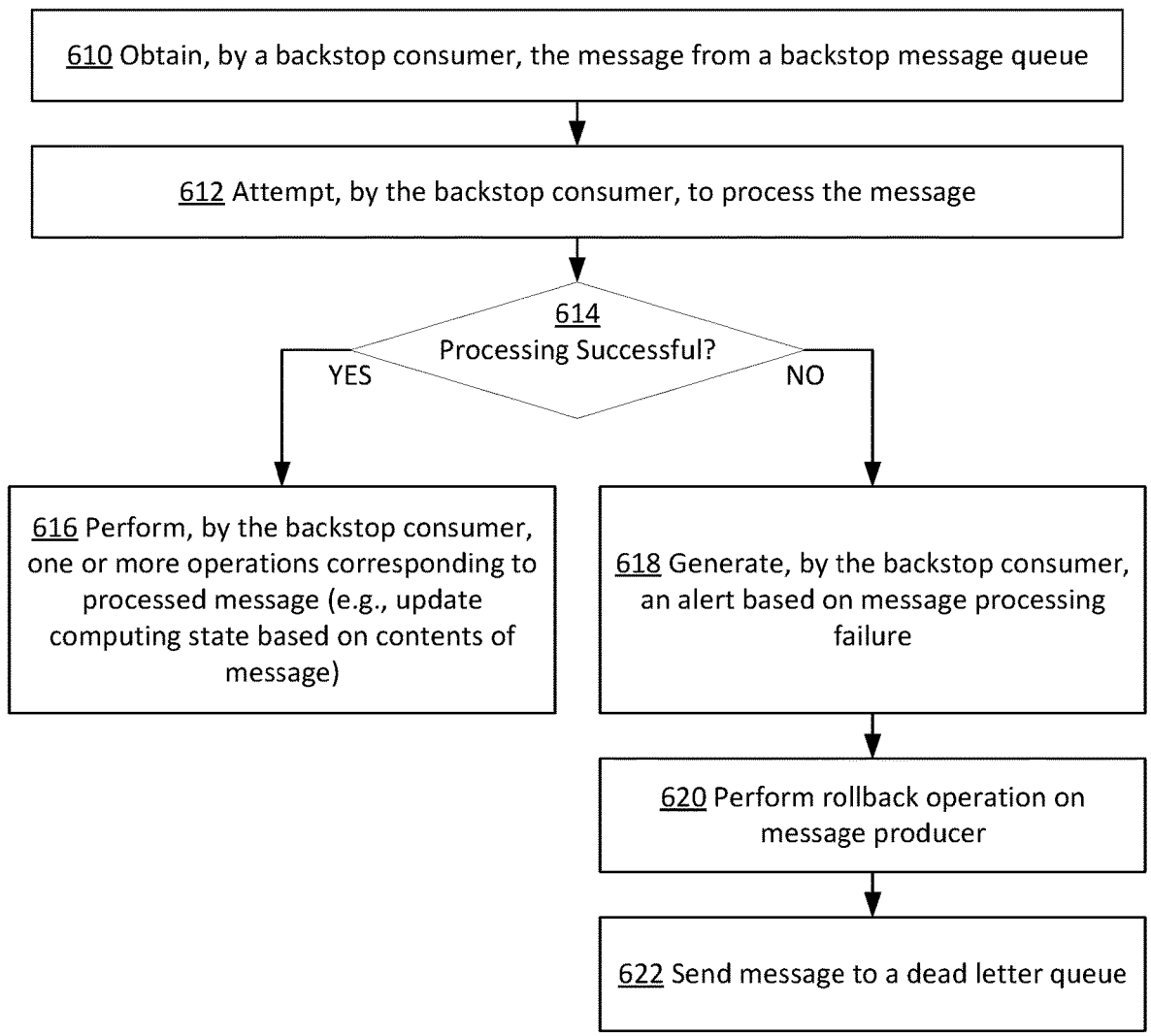
FIG. 6 is a flowchart illustrating a second example process for message processing with forward compatibility safety that may be used in accordance with the present disclosure.

Referring now to FIG. 6, a second example process for message processing with forward compatibility safety will now be described in detail. In some examples, the process of FIG. 6 may be a continuation of the process of FIG. 5, such as with operation 610 of FIG. 6 being performed after a performance of operation 522 of FIG. 5. It is also noted that the processes of FIG. 5 and/or FIG. 6 may be performed repeatedly any number of times for any number of different messages. The process of FIG. 6 is initiated at operation 610, at which a backstop consumer obtains a message from a backstop message queue. At operation 612, the backstop consumer attempts to process the message. For example, the backstop consumer may attempt to process the message based on a most recent message processing update (and potentially one or more prior message processing updates) that have been deployed to the backstop consumer at the time that the backstop consumer attempts to process the message. By contrast, the backstop consumer may not be able to employ message updates that have not yet been deployed to the backstop consumer at the time that the backstop consumer attempts to process the message.

At operation 614, it is determined if the message processing attempt by the backstop consumer is successful. For example, if the backstop consumer successfully reads data included in the message, such as by having compatibility with data formats employed in the message, then the backstop consumer may determine that processing is successful. By contrast, if the backstop consumer is unable to read data included in the message, such as because it does not have compatibility with one or more data formats employed in the message, then the backstop consumer may determine that processing has failed. If the message processing attempt is successful and the backstop consumer processes the message, then, at operation 616, the backstop consumer performs one or more operations corresponding to the processed message. For example, these operations may include updating a computing state based on contents of message. As a specific example, for certificate management services, this may include updating a state associated with a lifecycle of a certificate managed by the service. In one specific scenario, the message may have a format that is readable based on a first update that has already been deployed to the backstop consumer but that has not yet been deployed to the main consumer. In this scenario, the main consumer may be unable to process the message (e.g., as indicated by the NO branch of operation 518 of FIG. 5), but the backstop consumer may be capable of successfully processing the message (e.g., as indicated by the YES branch of operation 614 of FIG. 6).

By contrast, if the backstop consumer determines that the message processing attempt fails, then, at operation 618, the backstop consumer generates an alert based on the failure of the message of the processing attempt. The alert may be provided to the producer of the message, and the alert may trigger performance of a rollback operation at the message producer. At operation 620, a rollback operation is performed on the message producer. For example, the rollback operation may cause the message producer to temporarily revert to producing messages having an older format associated with an older message formatting update. At operation 622, the message is sent to a dead letter queue. It is noted that, in some examples, the backstop consumer may perform any number of message processing retry attempts before either successfully processing the message or determining to stop attempting to process the message.

As described above, in some examples, a backstop consumer may reattempt processing of a message any number of times before either successfully processing the message or determining to discontinue attempting processing of the message (and optionally generating an alert and/or sending the message to a dead letter queue). Additionally, in some examples, a main consumer may also reattempt processing of a message any number of times before either successfully processing the message or providing the message to the backstop consumers. However, the backstop consumer may be configured to reattempt processing more rigorously than the main consumer. This may include scenarios in which the backstop consumer is permitted more retry attempts than the main consumer. This may also include scenarios in which the backstop consumer is permitted one or more retry attempts and the main consumer is not permitted any retry attempts at all.

Figure 7:
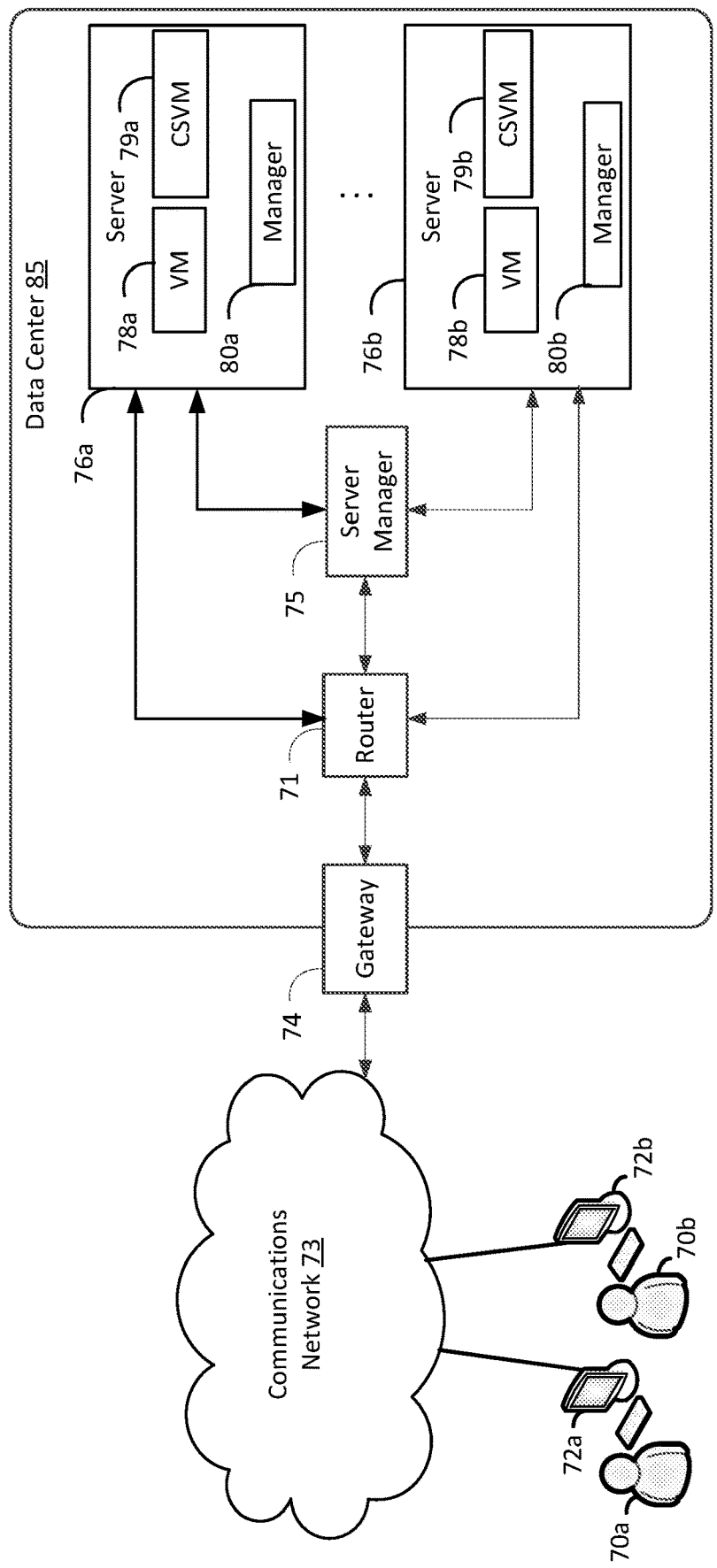
FIG. 7 is a diagram illustrating an example system for transmitting and providing data that may be used in accordance with the present disclosure.

An example system for transmitting and providing data will now be described in detail. In particular, FIG. 7 illustrates an example computing environment in which the embodiments described herein may be implemented. FIG. 7 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-b (which may be referred herein singularly as virtual machine instance 78 or in the plural as virtual machine instances 78). Additionally, consumer system virtual machines (CSVM's) 79a-b are virtual machine instances that are configured to perform any or all of the techniques described above associated with implementation of main consumers and backstop consumers, such as deploying updates first to backstop consumers and then to main consumers, attempting initial processing of messages by main consumers, sending messages to backstop consumers when main consumer processing fails, and the like.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 7, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 7 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 7, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 7, a server manager 75 is also employed to at least in part direct various communications to, from and/or between servers 76a and 76b. While FIG. 7 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 85 described in FIG. 7 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 8:
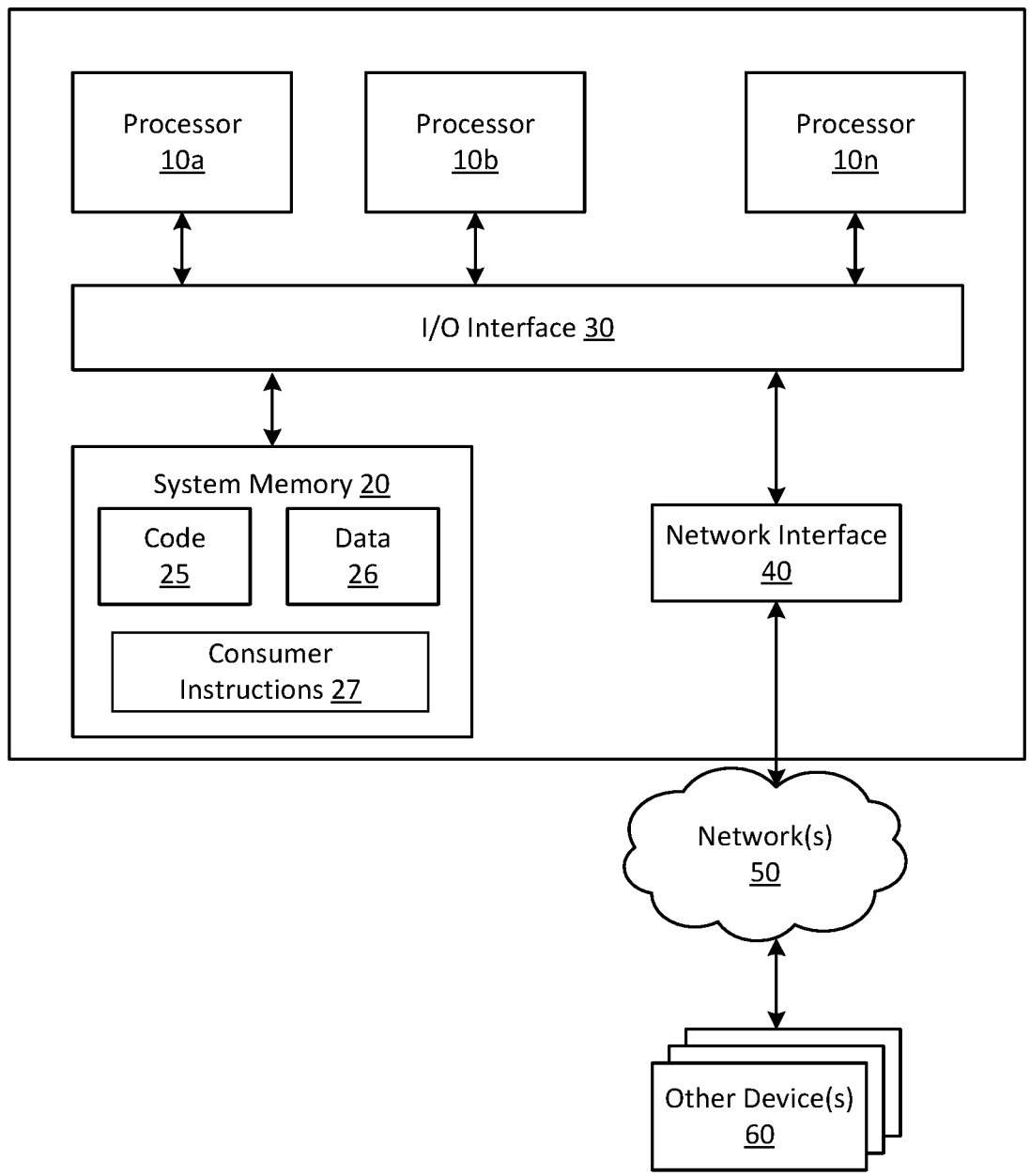
FIG. 8 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 8 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26. In the example of FIG. 8, system memory 20 includes container instructions 27, which may include computer-executable instructions for performing any or all of the techniques described above associated with implementation of main consumers and backstop consumers, such as deploying updates first to backstop consumers and then to main consumers, attempting initial processing of messages by main consumers, sending messages to backstop consumers when main consumer processing fails, and the like.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java' virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:
a set of consumers of a producer-consumer system of a certificate management service, wherein the set of consumers includes a main consumer subset and a backstop consumer subset, wherein a plurality of updates to message processing information are deployed to the set of consumers, wherein each update of the plurality of updates is first deployed to the backstop consumer subset and is subsequently deployed to the main consumer subset, and wherein the backstop consumer subset obtains only messages that have failed processing attempts performed by the main consumer subset; and
one or more memories having stored therein instructions that, upon execution by one or more computer processors, cause the one or more computer processors to perform operations comprising:
obtaining, by a first consumer in the main consumer subset, a first message;
performing, by the first consumer, a first processing attempt to process the first message;
determining, by the first consumer, that the first processing attempt has failed;
providing, by the first consumer, based on failure of the first processing attempt, the first message for processing by the backstop consumer subset;
obtaining, by a second consumer in the backstop consumer subset, the first message; and
processing, by the second consumer, the first message.

2. The computing system of claim 1, wherein the backstop consumer subset is configured to generate alerts based on failures of processing attempts by the backstop consumer subset.

3. The computing system of claim 2, wherein the alerts trigger performances of rollback operations on message producers.

4. The computing system of claim 1, wherein the backstop consumer subset is configured to re-attempt processing more rigorously than the main consumer subset.

5. A computer-implemented method comprising:
receiving, by a first consumer, a first message, wherein a set of consumers of a producer-consumer system includes a main consumer subset and a backstop consumer subset, wherein a plurality of updates to message processing information are deployed to the set of consumers, wherein each update of the plurality of updates is first deployed to the backstop consumer subset and is subsequently deployed to the main consumer subset, and wherein the first consumer is in the main consumer subset;
performing, by the first consumer, a first processing attempt to process the first message;
determining, by the first consumer, that the first processing attempt has failed;
providing, by the first consumer, based on failure of the first processing attempt, the first message for processing by the backstop consumer subset;
receiving, by a second consumer in the backstop consumer subset, the first message; and
processing, by the second consumer, the first message.

6. The computer-implemented method of claim 5, wherein the backstop consumer subset obtains only messages that have failed processing attempts performed by the main consumer subset.

7. The computer-implemented method of claim 5, wherein the first message has a format that is readable based on a first update that has already been deployed to the second consumer but that has not yet been deployed to the first consumer.

8. The computer-implemented method of claim 5, further comprising:
performing, by the second consumer, a second processing attempt to process a second message;
determining, by the second consumer, that the second processing attempt has failed; and
generating, by the second consumer, an alert based on failure of the second processing attempt.

9. The computer-implemented method of claim 8, wherein the alert triggers performance of a rollback operation on a message producer.

10. The computer-implemented method of claim 5, wherein the backstop consumer subset is configured to re-attempt processing more rigorously than the main consumer subset.

11. The computer-implemented method of claim 5, wherein the main consumer subset retrieves messages from one or more main message queues and wherein the backstop consumer subset retrieves messages from one or more backstop message queues that are separate from the one or more main message queues.

12. The computer-implemented method of claim 5, wherein the main consumer subset retrieves messages from only a single message queue.

13. One or more non-transitory computer-readable storage media having stored thereon computing instructions that, upon execution by one or computing devices, cause the one or more computing devices to perform operations comprising:
receiving, by a first consumer, a first message, wherein a set of consumers of a producer-consumer system of a certificate management service includes a main consumer subset and a backstop consumer subset, wherein a plurality of updates to message processing information are deployed to the set of consumers, wherein each update of the plurality of updates is first deployed to the backstop consumer subset and is subsequently deployed to the main consumer subset, and wherein the first consumer is in the main consumer subset;
performing, by the first consumer, a first processing attempt to process the first message;
determining, by the first consumer, that the first processing attempt has failed;
providing, by the first consumer, based on failure of the first processing attempt, the first message for processing by the backstop consumer subset;
receiving, by a second consumer in the backstop consumer subset, the first message;
performing, by the second consumer, a second processing attempt to process the first message;
determining, by the second consumer, that the second processing attempt has failed; and
generating, by the second consumer, an alert based on failure of the second processing attempt.

14. The one or more non-transitory computer-readable storage media having of claim 13, wherein the backstop consumer subset obtains only messages that have failed processing attempts performed by the main consumer subset.

15. The one or more non-transitory computer-readable storage media having of claim 13, wherein the alert triggers performance of a rollback operation on a message producer.

16. The one or more non-transitory computer-readable storage media having of claim 13, wherein the backstop consumer subset is configured to re-attempt processing more rigorously than the main consumer subset.

17. The one or more non-transitory computer-readable storage media having of claim 13, wherein the main consumer subset retrieves messages from one or more main message queues and wherein the backstop consumer subset retrieves messages from one or more backstop message queues that are separate from the one or more main message queues.

18. The one or more non-transitory computer-readable storage media having of claim 13, wherein the main consumer subset retrieves messages from only a single message queue.

19. The one or more non-transitory computer-readable storage media having of claim 13, wherein the operations further comprise:
   receiving, by a second consumer, a second message; and
   processing, by the second consumer, the second message.

20. The one or more non-transitory computer-readable storage media having of claim 19, wherein the second message has a format that is readable based on a first update that has already been deployed to the second consumer but that has not yet been deployed to the main consumer subset.

* * * * *